United States Patent
Teraya et al.

(10) Patent No.: US 7,905,019 B2
(45) Date of Patent: Mar. 15, 2011

(54) WORKING FLUID INJECTION APPARATUS FOR A FLUID DYNAMIC PRESSURE BEARING

(75) Inventors: Junji Teraya, Chiba (JP); Tetsuya Nagata, Chiba (JP)

(73) Assignee: Seiko Instruments Inc. (JP)

( * ) Notice: Subject to any disclaimer, the term of this patent is extended or adjusted under 35 U.S.C. 154(b) by 1237 days.

(21) Appl. No.: 10/589,388

(22) PCT Filed: Feb. 17, 2005

(86) PCT No.: PCT/JP2005/002492
§ 371 (c)(1),
(2), (4) Date: Aug. 15, 2006

(87) PCT Pub. No.: WO2005/078291
PCT Pub. Date: Aug. 25, 2005

(65) Prior Publication Data
US 2007/0175704 A1    Aug. 2, 2007

(30) Foreign Application Priority Data
Feb. 18, 2004  (JP) .................. 2004-041422

(51) Int. Cl.
*B21K 1/10* (2006.01)
(52) U.S. Cl. .................. 29/898.02; 29/898.07; 29/898.1; 29/724; 184/5.1; 184/7.4
(58) Field of Classification Search ................. 29/898.1, 29/898.02, 898.07, 724; 184/55.1, 6.22, 184/64, 7.4, 5.1; 384/107, 398, 399, 471; 141/5, 8
See application file for complete search history.

(56) References Cited

U.S. PATENT DOCUMENTS

| | | | |
|---|---|---|---|
| 5,524,728 A * | 6/1996 | Williams et al. | 184/29 |
| 6,733,180 B2 * | 5/2004 | Nakamura | 384/100 |
| 7,043,839 B2 * | 5/2006 | Hayashi et al. | 29/898.02 |
| 7,328,511 B2 * | 2/2008 | Misu et al. | 29/898.02 |
| 7,343,682 B2 * | 3/2008 | Sumi et al. | 29/898.1 |
| 7,344,002 B2 * | 3/2008 | Neumann et al. | 184/5.1 |
| 2003/0012465 A1 | 1/2003 | Nakamura | |
| 2003/0221317 A1 * | 12/2003 | Kaimi et al. | 29/898.02 |
| 2004/0020721 A1 | 2/2004 | Iwamoto | |
| 2004/0107577 A1 * | 6/2004 | Hayashi et al. | 29/898.02 |
| 2008/0098602 A1 * | 5/2008 | Teraya et al. | 29/898.02 |

FOREIGN PATENT DOCUMENTS

| | | |
|---|---|---|
| EP | 0 751 313 A1 | 1/1997 |
| JP | 9-14256 A | 1/1997 |

(Continued)

*Primary Examiner* — David P Bryant
*Assistant Examiner* — Ryan J Walters
(74) *Attorney, Agent, or Firm* — Adams & Wilks

(57) ABSTRACT

A working fluid injection apparatus for injecting a working fluid into a gap between a housing and a shaft of a bearing unit of a fluid dynamic pressure bearing. The apparatus has an adapter configured to support the bearing unit in a state in which an end portion of the shaft protrudes from an open portion of the housing. A cover member has an upper opening, a lower opening, and a tapered inner surface with a radial dimension that increases gradually from the lower opening to the upper opening. The cover member is configured to be mounted in contact with an upper surface of the housing when the bearing unit is supported by the adapter so that the lower opening of the cover member surrounds the open portion of the housing and so that the protruding end portion of the shaft and the tapered inner surface of the cover member form a reservoir portion that communicates with the open portion of the housing and that is configured to store a working fluid.

20 Claims, 5 Drawing Sheets

FOREIGN PATENT DOCUMENTS

| | | |
|---|---|---|
| JP | 2002-5170 A | 1/2002 |
| JP | 2002-168394 A | 6/2002 |
| JP | 2002-174243 A | 6/2002 |
| JP | 2002-213452 A | 7/2002 |
| JP | 2003-314791 A | 11/2003 |
| JP | 2005098393 | 4/2005 |

* cited by examiner

WORKING FLUID INJECTION APPARATUS FOR A FLUID DYNAMIC PRESSURE BEARING

Cross-Reference to Related Application

This application is a U.S. national stage application of International Application No. PCT/JP2005/002492, filed Feb. 17, 2005, claiming a priority date of Feb. 18, 2004, and published in a non-English language.

TECHNICAL FIELD

The present invention relates to a working fluid injection apparatus for a fluid dynamic pressure bearing, a method thereof, and a method of manufacturing a fluid dynamic pressure bearing.

BACKGROUND ART

Up to now, there are known, as working fluid injection methods for a fluid dynamic pressure bearing which is used for a recording medium driving device etc., methods disclosed in, for example, Patent Documents 1 to 3.

All of the working fluid injection methods disclosed in Patent Documents 1 to 3 are vacuum injection methods. The method in Patent Document 1 is one in which: a gap between a housing and a shaft and the inside of an injecting tube are decompressed to exhaust air with the use of the injecting tube airtightly connecting with the gap between the housing and the shaft; then, an open end of the injecting tube is dipped in a liquid surface of a working fluid; and thereafter, with the release of the decompressed state in its periphery, the working fluid is sucked and injected into the injecting tube and the gap between the housing and the shaft in the decompressed state.

Further, the working fluid injection method disclosed in Patent Document 2 is one in which: a peripheral environment of a bearing unit, which is constituted of a housing and a shaft and into which a working fluid is injected, is brought into a decompressed state to exhaust air within the bearing unit; and thereafter, with the release of the decompressed state, the working fluid is injected into the decompressed bearing unit due to an atmospheric pressure.

Further, the working fluid injection method disclosed in Patent Document 3 is one in which: a bearing unit, in which an annular concave portion having the same volume as a proper amount is formed at an open end of a gap between a housing and a shaft, is brought into a decompressed state to exhaust air within the bearing unit; a working fluid is dropped to be stored in the concave portion in the decompressed state; and thereafter, with the release of the decompressed state, the working fluid stored through utilization of a differential pressure between the inside and the outside of the bearing unit is injected into the gap of the bearing unit.

Patent Document 1: JP 2002-168394 A (p. 4, FIG.1 etc.)
Patent Document 2: JP 2002-5170 A (p. 3, FIG.1 etc.)
Patent Document 3: JP 2002-174243 A (p. 3, FIG.3 etc.)

SUMMARY OF THE INVENTION

However, according to the working fluid injection method in Patent Document 1, it is sufficient that the inside of the bearing unit and the injecting tube can be brought into a high vacuum state; however, there is an inconvenience that the air remaining in the injecting tube is injected into the bearing unit together with the working fluid in the case of a low vacuum degree. Especially, in the case of a bearing unit the size of which is extremely small, like a fluid dynamic pressure bearing used in a driving device for a small magnetic disc, the volume of a duct line including the injecting tube is predominantly large compared with the volume of the gap in the bearing unit. Thus, the problem is conspicuous.

Further, according to the working fluid injection method in Patent Document 2, since the working fluid is dropped to the open end of the gap between the housing and the shaft before decompression of the inside of the bearing unit, the air remaining in the gap is exhausted from the open end as air bubbles at the time of decompression. This case is followed by an inconvenience that the air in the form of air bubbles is broken when exhausted from the open end to thereby disperse droplets of the working fluid to the periphery. Particularly, in the method in Patent Document 2 in which the working fluid is supplied in the state where the air in the gap between the housing and the shaft is not exhausted at all, there is an inconvenience that: the air in the gap is heavily exhausted at the time of decompression; thus, a large amount of the working fluid is dispersed; and the droplets are attached to an outer surface of the housing and to the inside of a vacuum chamber, which requires cleaning in each case.

Moreover, the working fluid injection method according to Patent Document 3 includes an inconvenience that the bearing unit has to be formed, in advance, with the concave portion capable of storing the proper amount of the working fluid. In other words, the concave portion cannot be adopted without a margin in terms of design since the portion is used only at the time of injection of the working fluid and is not needed at the time of use of the fluid dynamic pressure bearing. Further, the same amount of the working fluid as the total volume of the gap is stored in the concave portion. Thus, ideally, the entire of the stored working fluid is injected into the gap, which does not require subsequent cleaning. However, in actuality, it is assumed that there is an inconvenience that part of the working fluid at the ring-shape open end is sucked into the gap first, and then, the air is taken into the gap.

The present invention has been made in view of the above circumstances, and therefore has an object to provide a working fluid injection apparatus for a fluid dynamic pressure bearing in which a working fluid can be filled into a fine gap of a bearing unit through simple and easy steps without mixture of the fluid with air bubbles and without dispersion of droplets of the working fluid to the periphery, a method thereof, and a method of manufacturing a fluid dynamic pressure bearing.

In order to achieve the above object, the present invention provides the following means.

The present invention provides a working fluid injection apparatus for a fluid dynamic pressure bearing, the apparatus being used for injecting a working fluid into a gap between a housing and a shaft in a bearing unit which is constituted by the housing having an opening portion and the shaft held in the housing with its end exposed from the opening portion, the apparatus being provided with: a cover member, which is arranged, in a contact state, on an upper surface of the housing, in which a ring-shape open portion for the gap in the opening portion is arranged upward, with the open portion being exposed, and which forms, above the open portion, a reservoir portion capable of storing the working fluid; a chamber which sealably holds the bearing unit onto which the cover member is mounted; a valve which opens/closes an internal space of the chamber with respect to an external space thereof; an exhaust device which exhausts air in the internal space of the chamber to obtain a decompressed state; a reservoir which stores the working fluid; and a dispenser which drops the working fluid stored in the reservoir onto the reservoir portion in the chamber in the decompressed state.

According to the present invention, in the state in which the cover member is mounted on the upper surface of the housing in the bearing unit, the resultant is arranged in the chamber, the valve is closed to bring the inside of the chamber into a sealed state, and then, the exhaust device is operated. Thus, the air in the internal space of the chamber is exhausted, as a result of which the inside of the chamber is brought into the decompressed state. In this state, the dispenser is operated in the chamber, and the working fluid is dropped from the reservoir onto the reservoir portion which is formed above the ring-shape open portion and is formed by the cover member. The dropped working fluid is stored in the reservoir portion so as to block the ring-shape open portion. Then, the valve is opened in this state to gradually raise the pressure to an atmospheric pressure in the chamber. Accordingly, the working fluid stored in the reservoir portion is injected into the gap from the ring-shape open portion due to the differential pressure between the inside and the outside of the bearing unit.

In this case, according to the present invention, the reservoir portion for temporarily storing the working fluid is formed by the cover member and above the housing. Thus, a special concave portion does not need to be provided in the bearing unit, and injection of a proper amount of the working fluid can be performed. Further, the working fluid is dropped directly to the open end of the gap without using an injecting tube. Thus, there does not occur an inconvenience that the working fluid is mixed with air even in the case of injection in the relatively light decompressed state. Therefore, the time for obtaining the decompressed state in the chamber can be reduced, which leads to the improvement in manufacturing efficiency. Further, the working fluid is injected into the gap in the state of being decompressed. Thus, air bubbles are not broken at the time of injection, and dispersion of the working fluid can be avoided.

In the present invention, it is preferable that: the shaft is arranged such that its end is protruded outward from the opening portion of the housing; and the reservoir portion is formed to have a ring shape between the outer peripheral surface of the protruded shaft and the cover member.

A screw hole or the like for fixing another member is usually formed in the upper end surface of the shaft. Thus, the reservoir portion is formed between the outer peripheral surface of the shaft and the cover member. Therefore, there can be avoided an inconvenience that the working fluid enters the screw hole.

Further, in the present invention, it is preferable that the cover member is provided with a lower opening larger than the open portion and a tapered inner surface that gradually expands upward from the lower opening.

This enables the working fluid to be stored between the tapered inner surface and the shaft. Thus, the working fluid is smoothly injected into the gap along the tapered inner surface when the decompressed state is released.

Further, in the present invention, it is preferable that a taper angle of the tapered inner surface is 45° to 75°, more preferably, 55° to 65°, even more preferably 60°.

This enables the flow of the working fluid along the tapered inner surface to be smoothed more.

Further, in the present invention, the inside of the reservoir for storing the working fluid may be arranged in a decompressed state.

This realizes that the mixed air is removed in advance from the working fluid stored in the reservoir. Thus, the air can be prevented from appearing as air bubbles after the injection into the bearing unit.

Moreover, in the present invention, there may be provided a controller which controls a valve such that the pressure in the chamber is gradually raised from a decompressed state to an atmospheric pressure state for 10 to 50 seconds, preferably 20 to 40 seconds, more preferably 25 to 35 seconds.

With the operation of the controller, the valve is controlled such that the pressure is raised relatively slowly from the decompressed state to the atmospheric pressure state. Thus, it can be avoided that the working fluid is injected into the gap together with the ambient air due to a rapid flow of the working fluid.

Furthermore, the present invention provides a working fluid injection method for a fluid dynamic pressure bearing, the method being used for injecting a working fluid into a gap between a housing and a shaft in a bearing unit which is constituted by the housing having an opening portion and the shaft held in the housing with its end exposed from the opening portion, the method including the steps of: arranging upwardly a ring-shape open portion for the gap in the opening portion; arranging a cover member, in a contact state, on an upper surface of the housing, the cover member forming a reservoir portion capable of storing the working fluid above the open portion; decompressing the bearing unit to exhaust air in the gap; dropping and storing the working fluid in the reservoir portion under a decompressed atmosphere after the exhaust of the air in the gap; and releasing the decompressed state in the bearing unit in the state in which the working fluid is stored.

According to the present invention, the cover member is mounted on the upper surface of the housing, and the working fluid is temporarily stored in the reservoir portion formed by the cover member. Thus, a proper amount of the working fluid can be injected into the gap of the bearing unit without forming a special concave portion or the like in the bearing unit.

In the present invention, it is preferable that the step of releasing the decompressed state is performed gradually for 10 to 50 seconds, more preferably 20 to 40 seconds, even more preferably 25 to 35 seconds.

This avoids the rapid flow of the working fluid at the time of injection, as a result of which the air can be prevented from being involved and mixed into the working fluid.

Further, in the present invention, in the step of dropping and storing the working fluid, the working fluid the volume of which is larger than the total volume of the gap may be stored.

This somewhat leaves the working fluid between an inner surface of an introducing tool and the shaft even if the working fluid is filled into the gap to the full volume of the bearing unit. That is, there can be avoided an inconvenience that the working fluid runs out in the open portion for the gap so that the air enters the gap on the midway of the injection of the working fluid.

Moreover, the present invention provides a method of manufacturing a fluid dynamic pressure bearing, including: inserting a shaft into a gap formed in a housing to structure a bearing unit in which an end of the shaft is exposed from an opening portion of the housing; arranging upwardly a ring-shape open portion for the gap formed between the opening portion of the housing and the shaft exposed from the opening portion; mounting a cover member, in a contact state, on an upper surface of the housing, the cover member structuring, above the open portion, a reservoir portion capable of storing a working fluid; decompressing the bearing unit to exhaust air in the gap; after the exhaust of the air, dropping and storing the working fluid onto the reservoir portion under a decompressed atmosphere; and releasing the decompressed state in the bearing unit in the state in which the working fluid is stored.

According to the present invention, there can be manufactured a fluid dynamic pressure bearing in which a working fluid is sufficiently filled in a fine gap between a housing and a shaft while not being mixed with air. With the fluid dynamic pressure bearing manufactured with the manufacturing method, there can be prevented the reduction in bearing capacity such as the occurrence of vibration or noise due to the generation of air bubbles since the air is not mixed in the working fluid, which enables the enduring use.

In the present invention, the release of the decompressed state is performed gradually for 10 to 50 seconds, preferably 20 to 40 seconds, more preferably 25 to 35 seconds.

This avoids the involvement of the air due to rapid injection of the working fluid, which enables manufacturing of the fluid dynamic pressure bearing which is filled with the working fluid not mixed with air.

Furthermore, in the present invention, it is preferable that the working fluid the volume of which is larger than the total volume of the gap is stored between the introducing tool and the shaft.

This enables prevention of the air entering the gap on the midway of the injection of the working fluid. Thus, there can be manufactured more reliably the fluid dynamic pressure bearing which is filled with the working fluid not mixed with air.

According to the present invention, there is an effect that the fluid dynamic pressure bearing can be manufactured in which: the working fluid can be injected into the fine gap between the housing and the shaft more easily and reliably; and the generation of the air bubbles is reduced in the working fluid during the use, which leads to reduction in vibration and noise.

DETAILED DESCRIPTION OF THE PREFERRED EMBODIMENT

Hereinafter, explanation will be made of an oil injection apparatus (working fluid injection apparatus, manufacturing apparatus) for a fluid dynamic pressure bearing and an oil injection method in accordance with an embodiment of the present invention with reference to FIGS. 1 to 6.

Prior to the explanation of an oil injection apparatus 1 in this embodiment, description will be made of a fluid dynamic pressure bearing 3 into which an oil 2 is injected by means of the oil injection apparatus 1 with reference to FIG. 3.

Figure 3:
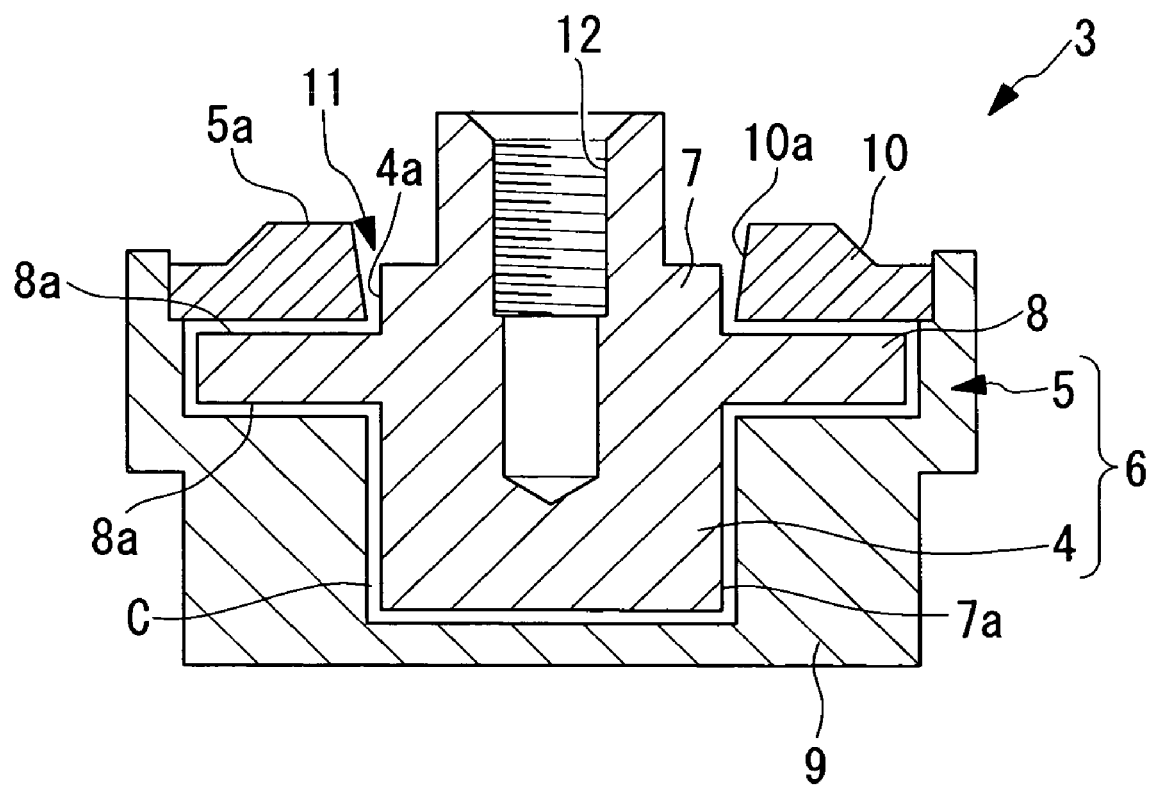
[FIG.3] A longitudinal sectional view showing a bearing unit into which oil is injected with the oil injection apparatus in FIG.1.

The fluid dynamic pressure bearing 3 includes a bearing unit 6 constituted of a shaft 4 and a housing 5 for accommodating the shaft 4, for example, as shown in FIG.3. The shaft 4 is provided with a substantially cylindrical shaft body 7 and a flange-shape thrust bearing plate 8 that protrudes in a radial direction from a midway position in a shaft direction of the shaft body 7. An outer peripheral surface 7a of the shaft body 7 and both end surfaces 8a in a thickness direction of the thrust bearing plate 8 are formed with dynamic pressure generating grooves (not shown in the figure). The inner surface of the housing 5 is arranged with a gap C which is interposed with respect to the outer peripheral surface 7a of the shaft body 7 and the both end surfaces 8a of the thrust bearing plate 8 which are formed with the dynamic pressure generating grooves. The gap C is filled with the oil 2 (refer to FIG.6).

The housing 5 is constituted of a housing main body 9 and a ring-plate-shape upper plate 10 arranged so as to close an upper end opening thereof. At the center of the upper plate 10 is provided an opening portion 10a through which one end of the shaft 4 is penetrated to protrude to the outside. The opening portion 10a is formed to have a tapered inner surface in which an aperture is increased gradually from the inside to the outside of the housing 5 in the shaft direction. The gap C between the shaft 4 and the housing 5 is opened to the outside through a ring-shape open portion 11 formed between the opening portion 10a of the upper plate 10 and the shaft 4. The gap between the shaft 4 and the housing 5 is completely filled with the oil 2, and the oil surface is provided to the open portion 11. As a result, the tapered inner surface of the opening portion 10a and an outer peripheral surface 4a of the shaft 4 constitute a capillary seal for holding and preventing the oil 2 from leaking out to the outside by virtue of surface tension.

The oil injection apparatus 1 in accordance with this embodiment is an apparatus in which the oil 2 is injected through the open portion 11 for the gap C which is formed between the inner surface of the opening portion 10a and the outer peripheral surface 4a of the shaft 4. The end portion of the shaft 4, which is penetrated through the opening portion 10a of the upper plate 10 to be exposed to the outside, is provided with a fixing portion comprised of a screw hole 12 for fixing, for example, a disc-shape recording medium (not shown in the figure) to the shaft 4.

The oil injection apparatus 1 for the fluid dynamic pressure bearing in accordance with this embodiment is provided with a base 13, a chamber 14 fixed to the base 13, a vacuum pump 15 (exhaust device) for sucking air in the chamber 14, a valve 16 for opening/closing an internal space of the chamber 14 against an external space thereof, a dispenser 17 having an injection port 17a in the chamber 14, a reservoir 18 for storing the oil 2 to be supplied to the dispenser 17, and a supply device 19 for taking the bearing unit 6 constituted of the shaft 4 and the housing 5 in/out with respect to the chamber 14. In the figures, reference numeral 20 denotes a flow control valve (controller) for controlling a flow rate of the air taken in the chamber 14 at the time of release of a decompressed state, reference numeral 21 denotes a filter, reference numeral 22 denotes a valve for being closed at the time when the inside of the chamber 14 reaches the sufficient decompressed state by means of the vacuum 15, and reference numeral 23 denotes a manometer.

The dispenser 17 is structured such that: the oil 2 in the reservoir 18 is pushed out by a plunger; and a constant amount of the oil 2 is supplied to the inside of the chamber 14 from the injection port 17a regardless of an air pressure in the chamber 14.

The reservoir 18 is constituted such that the internal space is kept in a decompressed state by means of the vacuum pump 15, and stores the oil 2 in the state in which the air dissolved in the oil 2 is exhausted (deaeration). Reference numeral 24 denotes a valve for being closed at the time when the inside of the reservoir 18 reaches the sufficient decompressed state, reference numeral 25 denotes a valve for obtaining an atmospheric pressure in the reservoir 18 at the time of supply of the oil 2 in the reservoir 18 to the dispenser 17, reference numeral 26 denotes a flow control valve, and reference numeral 27 denotes a filter.

The supply device 19 is provided with a mounting base 28 onto which the bearing unit 6 is mounted and an elevating mechanism 29 for elevating the mounting base 28 such that the bearing unit 6 is supplied to the chamber 14 through a through hole 14a provided in a bottom surface of the chamber 14 and that the fluid dynamic pressure bearing 3 filled with the oil 2 is taken out through the through hole 14a.

Figure 4:
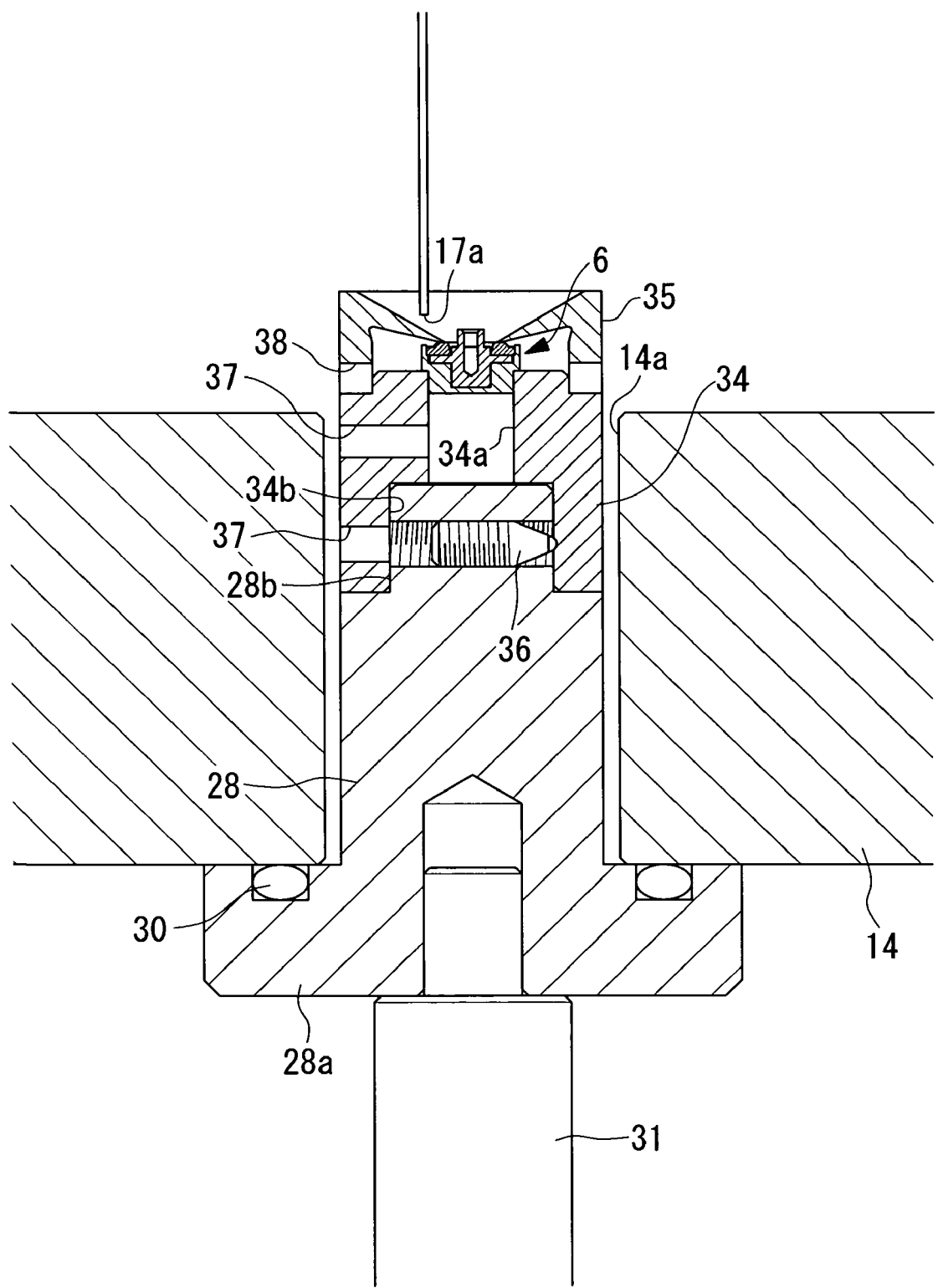
[FIG.4] A longitudinal sectional view showing a state in which the bearing unit and a cover member are arranged in a chamber while being mounted on a mounting base in the oil injection apparatus in FIG.1.

The mounting base 28 is provided with a flange 28a which is pushed against a lower surface of the chamber 14 in the state in which the bearing unit 6 is inserted into the chamber 14, as shown in FIG.4. The flange 28a is provided with O-ring-like sealing members 30 which are compressed to bring the inside of the chamber 14 into a sealed state when the flange 28a is pushed against the lower surface of the chamber 14. Further, the elevating mechanism 29 is provided with, for example, a rod 31 having a tip end attached with the mounting base 28, a cylinder 32 for moving the rod 31 in a vertical direction, and a guide sleeve 33 for supporting movement of the rod 31.

Further, as shown in FIG.4, the bearing unit 6 is mounted on the mounting base 28 while in the state of being assembled with an adapter 34 and a cover member 35. The adapter 34 is provided with a fitting hole 34a into which the outer surface of the housing 5 in the bearing unit 6 is fitted and a positioning hole 34b into which a boss portion 28b formed in the mounting base 28 is fitted. The bearing unit 6 is arranged such that the ring-shape open portion 11 is turned upward when being fitted into the fitting hole 34a of the adapter 34. In the figure, reference numeral 36 denotes a ball plunger for holding the adapter 34 in the state of being fitted into the boss portion 28. Further, reference numeral 37 denotes a through hole for connecting the space formed in the adapter 34 with the outside of the adapter 34.

The cover member 35 is arranged to cover the top of the bearing unit 6, which is arranged in the fitting hole 34a of the adapter 34 in a fitted state, thereby being fixed to an upper portion of the adapter 34. Thus, the bearing unit 6 is held while being sandwiched from the top and bottom by the adapter 34 and the cover member 35.

Figure 5:
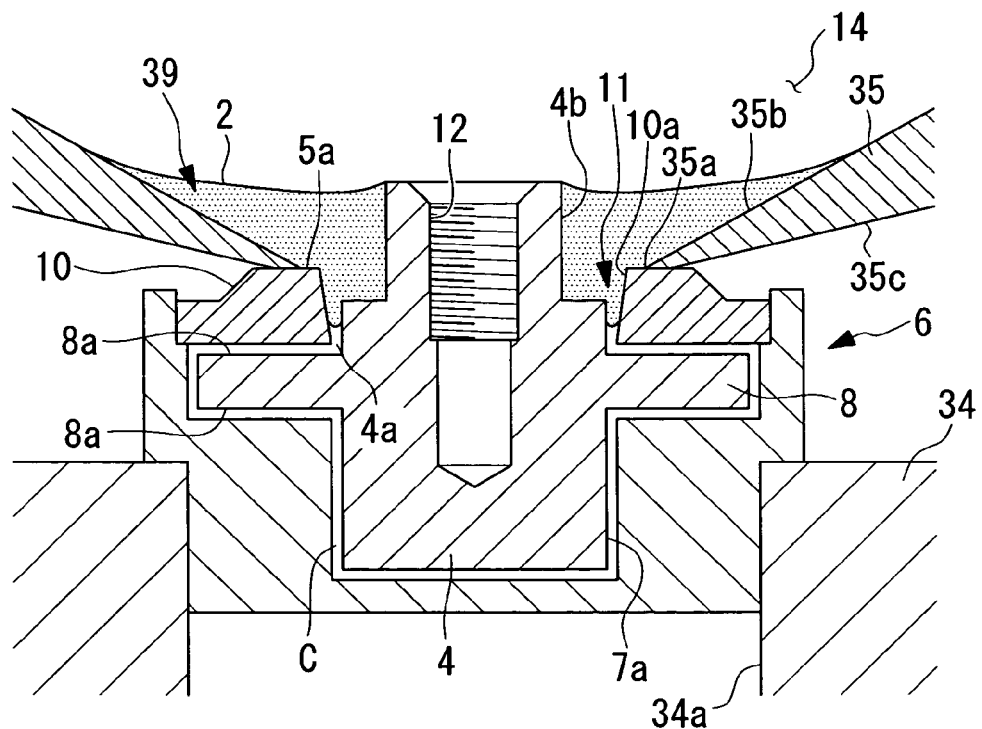
[FIG.5] A longitudinal sectional view showing a decompressed state in which oil is stored in a reservoir portion formed above an open portion of a gap of the bearing unit in FIG.3.
Figure 6:
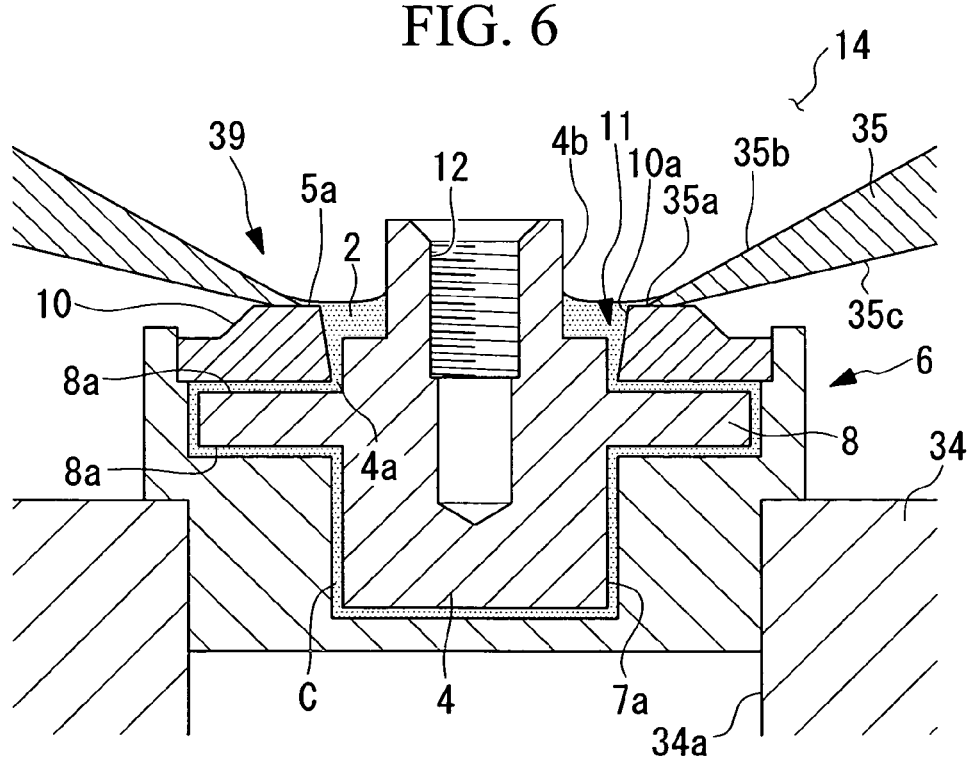
[FIG.6] A longitudinal sectional view showing a state in which the decompressed state in FIG.5 is released.

The cover member 35 is formed, at the center, with a through hole 35a larger than the ring-shape open portion 11, as shown in FIGS. 5 and 6. Further, the cover member 35 has a tapered inner surface 35b of which the radial dimension becomes larger gradually from the through hole 35a to the top. A taper angle of the tapered inner surface 35b is, for example, 60° with respect to a central shaft line. The taper angle of 60° enables the oil 2 to smoothly move to the open portion 11 of the gap along the tapered inner surface 35b. Note that the taper angle is not limited to 60°, and is may be 45° to 75°, preferably, 55° to 65°.

Further, as shown in FIG. 5, the cover member 35 is arranged such that a back surface 35c of the tapered inner surface 35b rises obliquely and upward from an upper surface 5a of the housing 5. Thus, only its inner periphery, that is, a relatively narrow annular area of the through hole 35a, of the cover member 35 is in contact with the upper surface 5a of the housing 5 that constitutes the bearing unit 6.

In FIG. 4, reference numeral 38 denotes a communicating groove for connecting the space surrounded by the cover member 35 and the adapter 34 with the outside.

The cover member 35 is attached to the upper portion of the adapter 34 in the state in which the bearing unit 6 is fitted into the fitting hole 34a of the adapter 34. As a result, the end of the shaft 4 constituting the bearing unit 6 and the ring-shape open portion 11 are exposed upward through the through hole 35a at the center of the cover member 35. Further, at this time, an outer peripheral surface 4b of the exposed shaft 4 and the tapered inner surface 35b of the cover member 35 constitute a ring-shape reservoir portion 39 above the open portion 11. The reservoir portion 39 is structured such that its volume is sufficiently larger than the total volume of the gap C in the bearing unit 6.

Further, the tapered inner surface 35b is formed to be sufficiently larger than the bearing unit 6 in outer diameter dimension. Thus, the tapered inner surface 35b forms a funnel-shape guide surface that expands in the periphery of the reservoir portion 39. As a result, the oil 2 rolls down the tapered inner surface 35b to be guided to the open portion 11 even if the injection port 17a of the dispenser 17 is arranged at the position separated from the open portion 11 in a radial direction.

Hereinafter, description will be made of the action of the oil injection apparatus 1 structured as above in accordance with this embodiment.

In order to inject the oil 2 into the gap C between the shaft 4 and the housing 5 in the bearing unit 6 by means of the oil injection apparatus 1 in this embodiment, first, the bearing unit 6 is assembled with the adapter 34, and the cover member 35 is assembled thereon. In this state, the resultant is mounted on the mounting base 28 by fitting the fitting hole 34b of the adapter 34 to the boss portion 28b of the mounting base 28. When the adapter 34 is fitted to the boss portion 28b, the adapter 34 is fixed so as not to come out from the mounting base 28 due to the operation of the ball plunger 36.

Then, the elevating mechanism 29 is operated to raise the mounting base 28, and the bearing unit 6 covered by the cover member 35 is guided into the chamber 14. In the chamber 14, the injection port 17a of the dispenser 17, which is turned downward, is arranged above the ring-shape reservoir portion 39 constituted by the cover member 35 and the outer peripheral surface 4b of the shaft 4, as shown in FIG.4.

When the bearing unit 6 is guided into the chamber 14, the seal members 30 provided to the flange 28a in the mounting base 28 are compressed to seal the inside of the chamber 14.

In this state, the valve 16 is closed to seal the inside of the chamber 14, and the vacuum pump 15 is operated to decompress the inside of the chamber 14. Through this process, air is exhausted from all of the spaces, which are in communication with the inside of the chamber 14, such as the gap C of the bearing unit 6 and the inner spaces formed by the adapter 34 and the cover member 35. Then, when the pressure in the chamber 14 reaches a predetermined decompressed state, for example, approximately 70 mTorr (9.3 Pa), the dispenser 17 is operated to thereby drop a predetermined amount of the oil 2 from the portion above the cover member 35. Thus, as shown in FIG.5, the oil 2 is stored in the reservoir portion 39, and then, blocks up the ring-shape open portion 11. At this time, the pressure in the gap C in the housing 5 balances that in the chamber 14. Therefore, the oil 2 does not enter the gap C due to surface tension, and is kept in the stored state in the reservoir portion 39.

Next, in the state in which the valve 22 is closed to seal the inside of the chamber 14, the valve 16 is opened, which leads to the release of the decompressed state in the chamber 14. At this time, with the operation of the flow control valve 20, the release of the decompressed state in the chamber 14 is slowly performed to recover the atmospheric state for, for example, about 30 seconds.

While the decompressed state in the chamber 14 is being released, the internal pressure of the chamber 14 rises gradually. However, the oil 2 keeps the open portion 11 in the bearing unit 6 in the blocked state, and thus, the gap C is maintained in the decompressed state. As a result, the oil 2 stored in the reservoir portion 39 is sucked into the gap C from the open portion 11 due to the differential pressure between the inside and the outside of the housing 5.

In this case, the total volume of the gap C is sufficiently small. Thus, the amount of the air remaining in the gap is extremely small, and the air does not remain as air bubbles after the injection of the oil 2. Further, since the amount of the oil 2 stored in the reservoir portion 39 is sufficiently larger than the total volume of the gap C, the oil 2 remains in the reservoir portion 39 even after the injection to the entire gap C, as shown in FIG. 6. Therefore, it does not occur that the oil 2 in the reservoir portion 39 runs out so that the air is taken into the gap C on the midway of the injection to the gap C.

Figure 1:
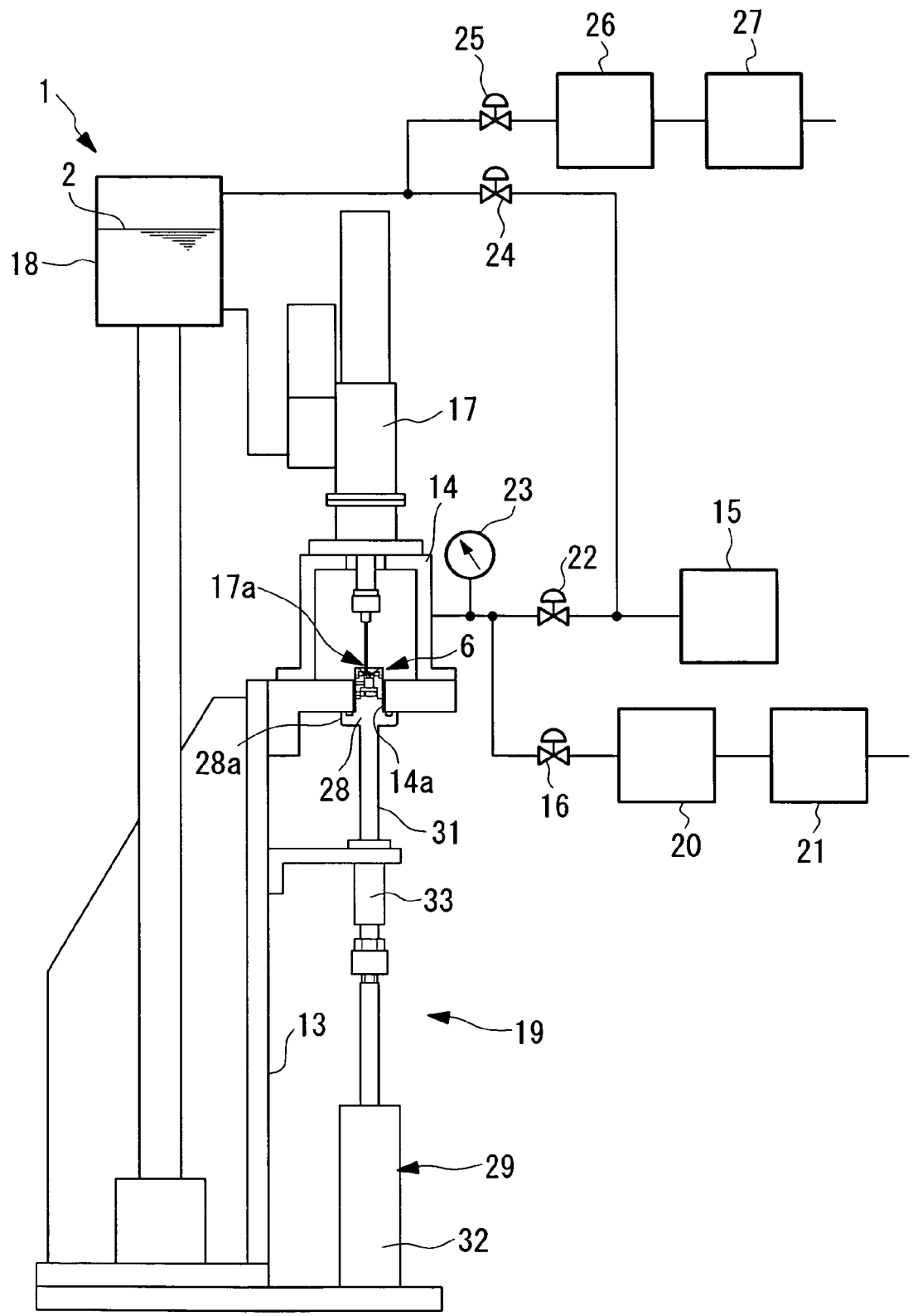
[FIG.1] An overall structural view schematically showing an oil injection apparatus in accordance with an embodiment of the present invention.
Figure 2:
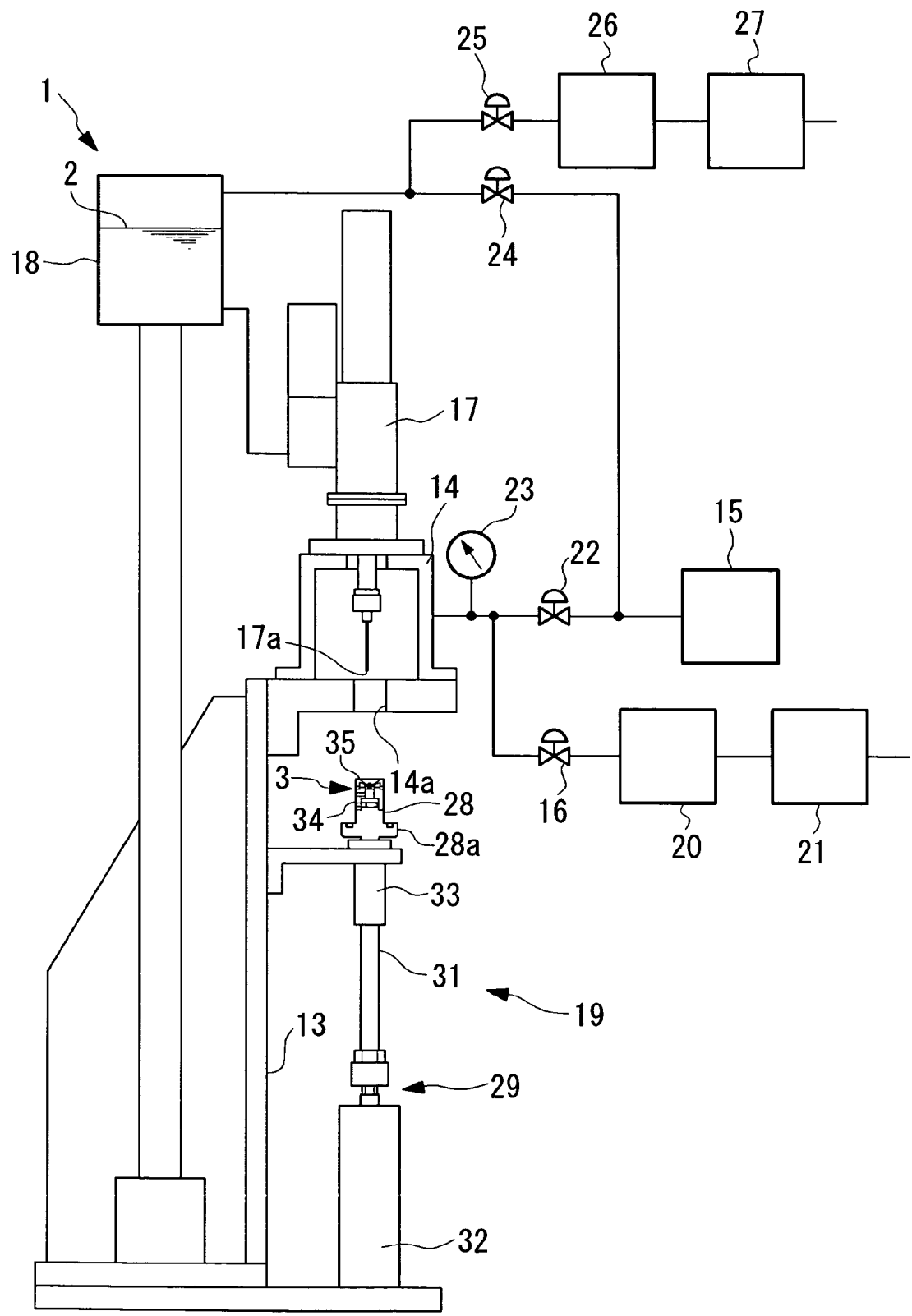
[FIG.2] A view showing a state in which a mounting base is lowered in the oil injection apparatus in FIG.1.

Then, after the completion of the injection to the gap C, the elevating mechanism 29 is operated to lower the mounting base 28, and the fluid dynamic pressure bearing 3, which is manufactured through the injection of the oil 2, is taken out of the chamber 14, as shown in FIG. 2. The excess oil 2 remaining in the reservoir portion 39 can be easily removed by a suction means (not shown in the figure) such as a syringe.

As described above, with the oil injection apparatus 1 and the oil injection method in accordance with this embodiment, the cover member 35 mounted on the bearing unit 6 forms the reservoir portion 39 for temporarily storing the oil 2 above the open portion 11 of the gap C. Thus, the oil 2 at an amount necessary for filling of the entire gap C can be supplied to the gap C without forming a concave portion for holding the oil 2 in the shaft 4 or the housing 5 which constitutes the bearing unit 6. Therefore, the useless concave portion, which does not function at the time of use of the bearing, does not need to be provided in the shaft 4 or the housing 5. Particularly, this is advantageous since a compact design can be realized without waste in the case of, for example, the fluid dynamic pressure bearing 3 for a small magnetic disc which has no margin for a waste structure in terms of design.

Further, the oil 2 is directly stored above the open portion 11 of the gap C, which is to be injected with the oil 2, not through an injecting tube or the like in the injection of the oil 2. Thus, the oil 2 can be injected while not being mixed with air. As a result, the mixture of the air can be avoided, and thus, there is an effect that the time required for decompression in the chamber 14 is reduced to thereby enable the improvement in operation efficiency. Note that the decompressed state has been explained with an example of 70 mTorr in the above embodiment, but is not limited to this.

Further, due to the shape of the cover member 35 mounted on the upper surface 5a of the housing 5, the volume of the reservoir portion 39 formed between the tapered inner surface 35b and the outer peripheral surface 4b of the shaft 4 can be set sufficiently larger than the total volume of the gap C in the housing 5. Thus, it can be prevented more certainly that the oil 2 in the reservoir portion 39 runs out so that the air enters the gap C on the midway of the injection.

Further, the oil 2 is stored in the reservoir portion 39 in the state in which the air in the gap C in the housing 5 is taken in advance, and thus, the air is not closed in the housing 5 when the decompressed state is released. Therefore, there can be avoided the occurrence of the phenomenon in which the closed air is released from the open portion 11 in the form of air bubbles. As a result, the oil 2 can be filled into the entire gap C without being dispersed to the periphery.

Further, the release of the decompressed state in the chamber 14 is slowly performed for approximately 30 seconds. Thus, when the oil 2 stored in the reservoir portion 39 is sucked into the gap C in the housing 5, the ambient air is not involved, as a result of which the air entering the gap C can be prevented more reliably. The time for the release of the decompressed state is not limited to 30 seconds, and may be 10 to 50 seconds, preferably 20 to 40 seconds, more preferably 25 to 35 seconds.

Moreover, the oil 2 to be stored in the reservoir portion 39 has been sufficiently deaerated by being in the decompressed state in the reservoir 18 before being supplied to the reservoir portion 39 with the dispenser 17. Thus, there is an advantage that air bubbles are difficult to be generated when the bearing is, in its use, in a negative pressure state at the time of, for example, generation of a dynamic pressure.

Further, the cover member 35 mounted on the upper surface of the housing 5 is not in contact with the entire upper surface 5a of the housing 5, but is only in contact with the surface at the ring-shape contact part having a predetermined width. Also, the back surface 35c against the tapered inner surface 35b is separated from the upper surface 5a of the housing 5 at a predetermined angle. Thus, a leakage of the oil 2 from the reservoir portion 39 limitedly affects the ring-shape contact part, and therefore, there can be avoided the occurrence of the inconvenience of the excess leakage, for example, the leakage to the outer peripheral surface of the housing 5.

Moreover, in this embodiment, the ring-shape reservoir portion 39 is provided between the tapered inner surface 35b of the cover member 35 and the outer peripheral surface 4b of the shaft 4, which protrudes from the opening portion 10a of the housing 5, and the oil 2 is stored in the reservoir portion 39. Therefore, the oil 2 can be prevented from entering the screw hole 12 as the fixing portion formed in the end surface of the shaft 4. The screw hole 12 needs to be in a degreased state for prevention of the slack. The oil 2 is prevented from entering the screw hole 12, thereby being capable of omitting a degreasing step, which is effective. In particular, when the oil 2 in the reservoir portion 39 is injected into the gap C, the air bubbles are not generated from the gap C, and therefore, it is prevented that the oil 2 in the reservoir portion 39 overflows into the screw hole 12.

Note that, in the case where the end of the shaft 4 is not protruded but only exposed from the opening portion 10a of the housing 5, the reservoir portion 39 may be arranged all over the inside of the tapered inner surface 35b of the cover member 35.

Moreover, description has been made of the bearing unit 6 into which the oil 2 is injected with an example of one having the thrust bearing plate 8 at the midway position in a shaft direction. However, the present invention is not limited to this example, and can be applied to an arbitrary sealing-type fluid dynamic pressure bearing having the open portion 11 for the gap C at its end.

The invention claimed is:
1. A working fluid injection apparatus for a fluid dynamic pressure bearing, the apparatus being used for injecting a working fluid into a gap between a housing and a shaft in a bearing unit of the fluid dynamic pressure bearing with the housing having an opening portion, the shaft being held in the housing with an end of the shaft exposed from the opening portion, and the gap forming a ring-shaped open portion in the opening portion of the housing, the working fluid injection apparatus comprising:
- an adapter configured to support the bearing unit in a state in which the ring-shaped open portion of the bearing unit housing opens upwards;
- a cover member having an upper opening, a lower opening larger than the ring-shaped open portion of the bearing unit housing, and a tapered inner surface with a radial dimension that increases gradually from the lower opening to the upper opening, the cover member being configured to be mounted in contact with an upper surface of the bearing unit housing when the bearing unit is supported by the adapter so that the lower opening of the cover member surrounds the ring-shaped open portion of the bearing unit housing and so that an outer peripheral surface of the exposed end of the bearing unit shaft and the tapered inner surface of the cover member form a reservoir portion that communicates with the ring-shaped open portion of the bearing unit housing and that is configured to store a working fluid;
- a chamber that sealably holds the bearing unit onto which the cover member is mounted;
- a valve device that opens and closes an internal space of the chamber with respect to a surrounding external space thereof;
- an exhaust device that exhausts air from the internal space of the chamber to place the internal space of the chamber in a predetermined decompressed state; and
- a dispenser that dispenses a working fluid into the reservoir portion when the chamber sealably holds the bearing unit and the internal space of the chamber is in the predetermined decompressed state.

2. A working fluid injection apparatus for a fluid dynamic pressure bearing according to claim 1; wherein:
- the adapter supports the bearing unit so that an outer peripheral surface of the exposed end of the shaft of the bearing unit protrudes outward from the opening portion of the housing; and
- the reservoir portion is formed to have a ring shape between the outer peripheral surface of the protruded exposed end of the shaft and the tapered inner surface of the cover member when the cover member is mounted in contact with the upper surface of the bearing unit housing.

3. A working fluid injection apparatus for a fluid dynamic pressure bearing according to claim 1; wherein a taper angle of the tapered inner surface of the cover member is in the range of 45° to 75° with respect to a central axis line of the bearing unit shaft.

4. A working fluid injection apparatus for a fluid dynamic pressure bearing according to claim 1; wherein a taper angle of the tapered inner surface of the cover member is in the range of 55° to 65° with respect to a central axis line of the bearing unit shaft.

5. A working fluid injection apparatus for a fluid dynamic pressure bearing according to claim 1; wherein the tapered inner surface of the cover member has a taper angle of 60° with respect to a central axis line of the bearing unit shaft.

6. A working fluid injection apparatus for a fluid dynamic pressure bearing according to claim 1; further comprising control means for controlling an intake air flow in the chamber such that the pressure in the chamber is gradually raised from the predetermined decompressed state to an atmospheric pressure state for a time period in the range of 10 to 50 seconds.

7. A working fluid injection apparatus for a fluid dynamic pressure bearing according to claim 1; further comprising control means for controlling an intake air flow in the chamber such that the pressure in the chamber is gradually raised from the predetermined decompressed state to an atmospheric pressure state for a time period in the range of 20 to 40 seconds.

8. A working fluid injection apparatus for a fluid dynamic pressure bearing according to claim 1; further comprising control means for controlling an intake air flow in the chamber such that the pressure in the chamber is gradually raised from the predetermined decompressed state to an atmospheric pressure state for a time period in the range of 25 to 35 seconds.

9. A working fluid injection apparatus for injecting a working fluid into a gap between a housing and a shaft of a bearing unit of a fluid dynamic pressure bearing, the working fluid injection apparatus comprising:
- an adapter configured to support the bearing unit in a state in which an end portion of the bearing unit shaft protrudes from an open portion of the bearing unit housing; and
- a cover member having an upper opening, a lower opening, and a tapered inner surface with a radial dimension that increases gradually from the lower opening to the upper opening, the cover member being configured to be mounted in contact with an upper surface of the bearing unit housing when the bearing unit is supported by the adapter so that the lower opening of the cover member surrounds the open portion of the bearing unit housing and so that the protruding end portion of the bearing unit shaft and the tapered inner surface of the cover member form a reservoir portion that communicates with the open portion of the bearing unit housing and that is configured to store a working fluid.

10. A working fluid injection apparatus according to claim 9; further comprising a chamber configured to sealably hold the bearing unit onto which the cover member is mounted; a valve device that opens and closes an internal space of the chamber with respect to a surrounding external space thereof; an exhaust device that exhausts air from the internal space of the chamber to place the internal space of the chamber in a predetermined decompressed state; and a dispenser that dispenses a working fluid into the reservoir portion when the chamber sealably holds the bearing unit and the internal space of the chamber is in the predetermined decompressed state.

11. A working fluid injection apparatus according to claim 9; wherein a taper angle of the tapered inner surface of the cover member is in the range of 45° to 75° with respect to a central axis line of the bearing unit shaft.

12. A working fluid injection apparatus according to claim 9; further comprising control means for controlling an intake air flow in the chamber such that the pressure in the chamber is gradually raised from the predetermined decompressed state to an atmospheric pressure state for a time period in the range of 10 to 50 seconds.

13. A working fluid injection apparatus according to claim 9; further comprising a mounting base that supports the adapter; and wherein the adapter has a fitting hole into which an outer surface of the bearing unit housing is fitted and a positioning hole into which a boss portion of the mounting base is fitted.

14. A working fluid injection apparatus according to claim 9; wherein the cover member has an outer surface configured to extend obliquely and outwardly from the upper surface of the bearing unit housing so that only a periphery of the cover member surrounding the lower opening thereof is in contact with the upper surface of the bearing unit housing.

15. A working fluid injection apparatus according to claim 9; wherein the reservoir portion is configured to store a larger volume of working fluid than the gap between the bearing unit housing and the bearing unit shaft.

16. An apparatus comprising:
a bearing unit having a shaft and a housing accommodating the shaft to form a gap between an inner surface of the housing and an outer surface of the shaft, the housing having a closed end, an open end, and a plate covering a portion of the open end except for a portion of the open end through which an end of the shaft protrudes outwardly from the housing;
an adapter supporting the bearing unit housing at the closed end thereof; and
a cover member having an upper opening, a lower opening, and a tapered inner surface with a radial dimension that increases gradually from the lower opening to the upper opening, the cover member being mounted in contact with the plate of the bearing unit housing so that the lower opening surrounds the portion of the open end through which the end of the bearing unit shaft protrudes and so that the protruding end of the bearing unit shaft and the tapered inner surface of the cover member form a reservoir portion that communicates with the portion of the open end of the bearing unit housing and that is configured to store a working fluid.

17. An apparatus according to claim 16; further comprising a chamber that sealably holds the bearing unit supported by the adapter and onto which the cover member is mounted; a valve device that opens and closes an internal space of the chamber with respect to a surrounding external space thereof; an exhaust device that exhausts air from the internal space of the chamber to place the internal space of the chamber in a predetermined decompressed state; and a dispenser that dispenses a working fluid into the reservoir portion when the internal space of the chamber is in the predetermined decompressed state.

18. An apparatus according to claim 16; further comprising a mounting base that supports the adapter; and wherein the adapter has a fitting hole into which an outer surface of the bearing unit housing is fitted and a positioning hole into which a boss portion of the mounting base is fitted.

19. An apparatus according to claim 16; wherein the cover member has an outer surface that extends obliquely and outwardly from the plate of the bearing unit housing so that only a periphery of the cover member surrounding the lower opening thereof is in contact with the plate of the bearing unit housing.

20. An apparatus according to claim 16; wherein the reservoir portion is configured to store a larger volume of working fluid than the gap between the inner surface of the bearing unit housing and the outer surface of the bearing unit shaft.

* * * * *